(No Model.)
T. D. GALLOWAY.
SPRING HOE ATTACHMENT FOR SEEDING MACHINES.
No. 313,719. Patented Mar. 10, 1885.
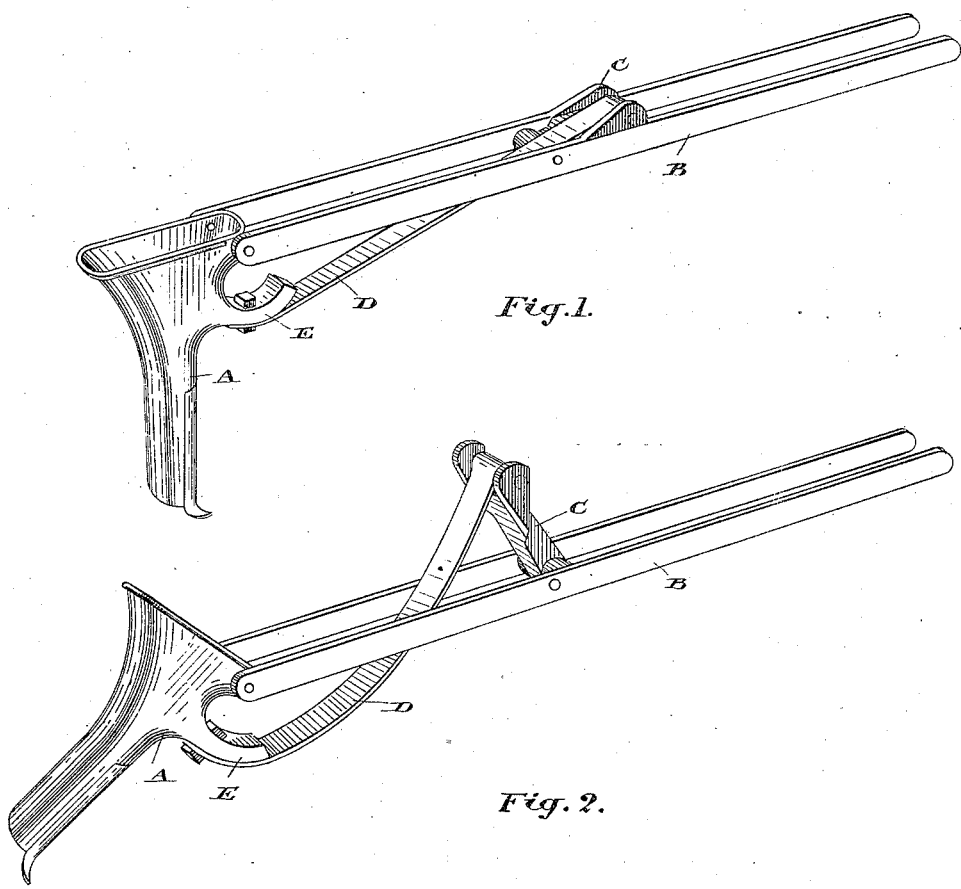
Witnesses.
J. B. Fitzsimmonshaugh
Charles C. Baldwin
Inventor.
Thomas D. Galloway
by Donald C. Ridout & Co
Attys

UNITED STATES PATENT OFFICE.

THOMAS D. GALLOWAY, OF OSHAWA, ONTARIO, CANADA.

SPRING-HOE ATTACHMENT FOR SEEDING-MACHINES.

SPECIFICATION forming part of Letters Patent No. 313,719, dated March 10, 1885.

Application filed December 11, 1884. (No model.) Patented in Canada December 13, 1884, No. 37,561.

*To all whom it may concern:*

Be it known that I, THOMAS DOBBIE GALLOWAY, of the town of Oshawa, in the county of Ontario, in the Province of Ontario, Canada, mechanic, have invented a certain new and useful Improvement in Spring-Hoe Attachments for Seeding-Machines; and I do hereby declare that the following is a full, clear, and exact description of the same.

The object of the invention is to devise an attachment by which the pivoted hoe is locked in position for work by a bar or plate, which effects the combined offices of brace and recoil-spring; and it consists, essentially, of a spring plate or rod connected at one end to a pivoted hoe at a point below or above its pivot, the said spring-plate extending diagonally to a point above or below the drag-bar, where its other end is connected to the free end of a locking-stud pivoted to the drag-bar, the line of draft, when the hoe is set for work, being substantially on a center line drawn through the pivot-points of the locking-stud, substantially as hereinafter more particularly explained.

Figure 1 is a perspective side view of a hoe and drag-bar provided with my improved locking attachment, the hoe being shown as it appears when set for work. Fig. 2 is a similar view showing the position of the parts when the hoe is in the act of passing over an obstruction.

A is an ordinary hoe pivoted to the drag-bar B.

C is a locking-stud, one end of which is pivoted to the drag-bar B, while on its other or free end the spring plate or rod D is pivoted. This spring plate or rod extends diagonally toward the hoe to a point below its pivot, where it is connected to a horn or projection, E, formed on the hoe A, as represented. It will be noticed that the horn or projection E extends beyond the point where it is connected to the spring bar or plate. When the hoe is set as shown in Fig. 1, the spring-plate D is perfectly straight, acting in that position as a brace for holding the hoe to its work, the locking-stud C being set back, as indicated in Fig. 1, so that a line drawn through the two pivot-points of the stud C shall be substantially the line of draft. Consequently a toggle-joint is formed between the spring-plate D and locking-stud C, which will only be broken when unusual pressure is directed against the hoe. In such a case the plate D will spring sufficiently to cause the locking-stud C to roll on its pivot and assume the position it is indicated in in Fig. 2. As the hoe A rolls on its pivot the horn E is brought into contact with the top side of the spring-plate E, which action bends the said spring-plate, causing it to act as a recoil-spring for bringing back the hoe into its initial position immediately that the obstruction which caused the undue pressure is passed. In this way the spring-plate D not only acts as a brace for holding the hoe to its work, but also, as before stated, performs the duty of a recoil-spring for pulling back the hoe into its initial position after the obstruction which may have caused it to open is passed.

I am aware of United States Patent No. 234,566, in which a pivoted hoe is shown held in position for work by a spring which acts as a brace as well as a recoil-spring; but in the device shown in this patent the hoe is not rigidly held in position for work by a toggle-joint, the brace being purely a spring imparting only a spring tension to the hoe, whereas in my device the hoe is held rigidly to its work by the spring-bar D, which acts exactly in the same manner as the ordinary brace now used until the toggle-joint is broken, when it immediately assumes the additional office of a recoil-spring, as hereinbefore explained.

I am also aware of the Patent No. 271,533, and make no claim to the construction shown therein as forming part of my invention.

What I claim as my invention is—

1. A spring-brace connected at one end to a pivoted hoe, the said spring-brace extending diagonally to and connected with the free end of a locking-stud pivoted to the drag-bar, the line of the draft when the hoe is set for work being substantially on a center line through the pivot-points of the locking-stud, substantially as and for the purpose specified.

2. A pivoted hoe, A, provided with a projection or horn, E, in combination with the spring-brace D, rigidly fastened at one end to the horn E, and pivotally connected at its other end to a locking-stud, C, pivoted to the drag-bar B, substantially as and for the purpose specified.

Toronto, December 3, 1884.

T. D. GALLOWAY.

In presence of—
 DONALD C. RIDOUT,
 JAS. E. MAYBEE.